United States Patent
Parusel et al.

(10) Patent No.: US 11,780,214 B2
(45) Date of Patent: Oct. 10, 2023

(54) THREE-LAYER UV PROTECTIVE FILM FOR DECORATIVE LAMINATED SHEETS (HPL)

(71) Applicants: Markus Parusel, Messel (DE);
Michael Enders, Dieburg (DE);
Claude Guenanten, Darmstadt (DE);
Michael Golder, Belfort (FR)

(72) Inventors: Markus Parusel, Messel (DE);
Michael Enders, Dieburg (DE);
Claude Guenanten, Darmstadt (DE);
Michael Golder, Belfort (FR)

(73) Assignee: Roehm GmbH, Darmstadt (DE)

( * ) Notice: Subject to any disclaimer, the term of this patent is extended or adjusted under 35 U.S.C. 154(b) by 575 days.

(21) Appl. No.: 15/313,987

(22) PCT Filed: May 19, 2015

(86) PCT No.: PCT/EP2015/060929
§ 371 (c)(1),
(2) Date: Nov. 25, 2016

(87) PCT Pub. No.: WO2015/180995
PCT Pub. Date: Dec. 3, 2015

(65) Prior Publication Data
US 2017/0197391 A1    Jul. 13, 2017

(30) Foreign Application Priority Data

May 26, 2014  (DE) ............... 10 2014 210 007.0

(51) Int. Cl.
| | |
|---|---|
| *B32B 27/18* | (2006.01) |
| *B32B 27/30* | (2006.01) |
| *B32B 27/10* | (2006.01) |
| *B32B 27/08* | (2006.01) |
| *B32B 21/08* | (2006.01) |
| *B32B 37/10* | (2006.01) |

(52) U.S. Cl.
CPC ............. *B32B 27/10* (2013.01); *B32B 21/08* (2013.01); *B32B 27/08* (2013.01); *B32B 27/18* (2013.01); *B32B 27/30* (2013.01); *B32B 27/304* (2013.01); *B32B 27/308* (2013.01); *B32B 37/10* (2013.01); *B32B 2307/558* (2013.01); *B32B 2307/71* (2013.01); *B32B 2309/02* (2013.01); *B32B 2309/04* (2013.01); *B32B 2309/12* (2013.01); *B32B 2317/125* (2013.01); *B32B 2333/12* (2013.01)

(58) Field of Classification Search
CPC ..... B32B 27/30; B32B 2333/12; B32B 27/10; B32B 27/08; B32B 27/18
See application file for complete search history.

(56) References Cited

U.S. PATENT DOCUMENTS

| | | | | |
|---|---|---|---|---|
| 4,558,098 | A * | 12/1985 | Kamata | ............... C08L 35/06 525/207 |
| 6,444,311 | B1 * | 9/2002 | Friedman | ............... B32B 27/32 428/354 |
| 7,901,778 | B2 * | 3/2011 | Swei | ............... B32B 27/18 428/522 |
| 2002/0064652 | A1 * | 5/2002 | Lau | ............... C09J 151/00 428/355 EN |
| 2004/0030046 | A1 * | 2/2004 | Schultes | ............... C08F 265/04 525/71 |
| 2007/0185270 | A1 * | 8/2007 | Arndt | ............... B32B 15/08 525/199 |
| 2008/0145652 | A1 | 6/2008 | Bonnet et al. | |
| 2008/0311406 | A1 * | 12/2008 | Bonnet | ............... B32B 7/12 428/421 |
| 2012/0302695 | A1 * | 11/2012 | Osae | ............... C09J 123/286 528/73 |
| 2013/0096237 | A1 * | 4/2013 | Schuetz | ............... C08J 5/045 524/13 |
| 2015/0044441 | A1 | 2/2015 | Guenanten et al. | |

FOREIGN PATENT DOCUMENTS

| | | |
|---|---|---|
| EP | 1 664 191 | 7/2004 |
| WO | 2013/160121 A1 | 10/2013 |

OTHER PUBLICATIONS

International Search Report dated Aug. 20, 2015 in PCT/EP2015/060929 filed May 19, 2015.

* cited by examiner

*Primary Examiner* — Maria V Ewald
*Assistant Examiner* — Daniel P Dillon
(74) *Attorney, Agent, or Firm* — Oblon, McClelland, Maier & Neustadt, L.L.P.

(57) ABSTRACT

The present invention relates to novel films for application on materials as protective film in respect of weathering effects. In particular, the present invention relates to a novel film composite which has at least three layers and which features particularly good adhesion on the substrate and particularly good optical properties. The outermost layer here is a layer comprising a fluoropolymer, the middle layer is a PMMA layer comprising at least one UV absorber and/or UV stabilizer, and the innermost layer is a PMMA layer comprising at least one adhesion promoter which improves adhesion on the substrate.

13 Claims, No Drawings

THREE-LAYER UV PROTECTIVE FILM FOR DECORATIVE LAMINATED SHEETS (HPL)

FIELD OF THE INVENTION

The present invention relates to novel films for application on materials as protective film in respect of weathering effects. In particular, the present invention relates to a novel film composite which has at least three layers and which features particularly good adhesion on the substrate and particularly good optical properties. The outermost layer here is a layer comprising a fluoropolymer, the middle layer is a PMMA layer comprising at least one UV absorber and/or UV stabilizer, and the innermost layer is a PMMA layer comprising at least one adhesion promoter which improves adhesion on the substrate.

The present invention in particular relates here to UV-protective films for what are known as high-pressure laminates (HPLs). These HPLs can be produced by laminating melamine- and phenol-resin-impregnated papers to one another under high pressure of at least 5 MPa (spec.), at temperatures above 120° C. with a cycle time that is generally from 30 to 100 min. The resultant composite material here is equipped with a decorative outer layer. It is thus possible to realize particular visual effects, e.g. wood imitations or single-colour decorative effects.

These decorative high-pressure laminates are used in many application sectors. Among these are by way of example table tops, doors, furniture, kitchen worktops, and also sheets for cladding of walls, of balconies or of facades. Whereas the internal applications require no particular protection from UV, the melamine resin surface must be equipped with an additional protective layer in outdoor use, because unprotected melamine resin surfaces exhibit significant degradation even after a relatively short time. The field of the present invention is in particular improvement of the resistance of HPLs to weathering and to UV, for outdoor use.

Suitable, i.e. more particularly durable, protection of HPLs can be achieved by way of example by simultaneous lamination of a UV-protective film based on poly(methyl) methacrylate. In one particular embodiment, there is an additional PVDF layer on the external side of the UV-protective film, in order to improve the soiling performance, and also the chemicals resistance, of the entire composite.

However, it has been found that the purely physical adhesion of the UV-protective film to the reactive-resin-coated papers is not sufficient to ensure stability of a composite over a number of years. Partial or even complete delamination of the film from the HPL surface, caused by weathering effects, has been observed after a few years.

It was therefore an object to develop a UV-protection system which in combination with the reactive-resin-impregnated papers can realize a stable composite which has adequate resistance to UV.

This technical object has been achieved by way of example in EP 1 664 191 in that the film side that is laminated to the melamine-resin-impregnated papers is equipped with an adhesion promoter, for example one based on anhydrides. The anhydride here takes the form of functional group on a polymethacrylate. During the HPL-press procedure the anhydride reacts with the melamine resin by way of a nucleophilic addition reaction. The combination of physical and also chemical bonding of the film to the material, and also the use of a UV-protection package, can thus produce decorative high-pressure laminates that are stable for a number of years in outdoor use. These films according to EP 1 664 191 optionally take the form of coextruded films with an external PVDF layer.

However, various disadvantages have recently become apparent, in particular in the case of the coextruded films. These are in particular apparent when service times are very long or when the HPLs thus equipped are subjected to artificial weathering for comparison purposes. These coextruded films also exhibited, directly after the lamination process, what is known as blue sheen, i.e. discoloration that can produce a bluish effect. Another possibility, in order to counter this effect, is to use only very small quantities of adhesion promoter for the coextruded film. After weathering, however, these films exhibiting no, or only very slight residual, blue sheen delaminate, either between the coextruded layers or from the actual HPL. It was often also possible to observe both effects—delamination and blue sheen; higher adhesion promoter content here leads to a tendency towards blue sheen and delamination of the coextruded layers, while small contents lead to a tendency towards delamination from the HPL.

U.S. 2008/0311406 describes a three-layer film composed of: A.) an external PVDF layer, B.) an intermediate layer composed of a PVDF-PMMA blend which comprises UV absorber, e.g. Tinuvin 234, and C.) an adhesion-promoter layer which comprises inter alia an anhydride of methacrylic acid. A particular feature of the film is that it exhibits no white discoloration when tested in water for 2 h at 100° C., and moreover exhibits good adhesion to melamine-resin-impregnated papers. However, the high PVDF content in the intermediate layer B here is an economic disadvantage.

Object

It was therefore an object of the present invention, with respect to the prior art, to provide a novel film for the finishing of HPLs which, even when it is subject to the effect of weathering in long periods of external use, exhibits no delamination, no blue sheen, and excellent optical properties, for example with a low haze value.

In particular, it was an object of the present invention to provide a novel film for HPLs which exhibits good initial, and also long-term, adhesion when laminated to HPL.

Another object of the present invention was to provide a film which reliably provides not only high intrinsic weathering resistance but also adequate protection for items susceptible to weathering, for example HPLs, from moisture, wind, insolation and in particular UV radiation.

Other objects not explicitly mentioned will be apparent from the description below, and also from the Examples and the Claims of the present specification.

Achievement of Object

The objects are achieved through the provision of a novel UV-protective film suitable for lamination on high-pressure laminates (HPLs). This protective film has, from the outside to the inside, the following layers bonded to one another: a layer A comprising a fluoropolymer, a PMMA layer B comprising at least one UV stabilizer and/or UV absorber, and a layer C comprising at least one adhesion promoter and at least one poly(meth)acrylate. It is preferable that both of the layers B and C respectively comprise at least one UV stabilizer and/or UV absorber.

The layer C here can be laminated to a resin-impregnated paper, preferably to a melamine-resin-impregnated paper, to give an HPL. The protective film is moreover characterized in that the layer B or the layer C comprises at least one impact-modifier. It is also optionally possible that both layers B and C comprise at least one impact modifier. It is preferable that the thickness of the layer A is from 1 to 25 µm, preferably from 5 to 20 µm, that the thickness of the layer B is from 15 to 125 µm, preferably from 10 to 100 µm, particularly preferably from 10 to 60 µm, and that the thickness of the layer C is from 1 to 25 µm, preferably from 5 to 20 µm.

Surprisingly, with the structure of the invention for the protective films it has been found that the decoupling of the adhesion-promoter layer C from the fluoropolymer layer A provides compliance with all of the technical features required for the production of HPLs, for example high chemicals resistance, a high level of UV-protection, good chemical bonding or very good appearance, and that the HPL equipped with the protective film also exhibits no blue sheen either directly after the lamination process or after weathering. Delamination after weathering is also observed only very rarely, and to an extent that is significantly reduced in comparison with the prior art.

According to the invention, the protective films of the invention are suitable for the production of HPLs and also for the production of what are known as MPLs (medium-pressure laminates) or what are known as CPLs (continuous pressure laminates).

Pressures and/or temperatures used for producing MPLs are lower than those for HPLs. Conditions for producing CPLs are the same as those for HPLs, except that cycle times for CPLs are reduced to from 2 to 30 min.

The UV stabilizers present for UV-stabilization in the layers B and/or C, preferably in layer B or in the layers B and C, are generally sterically hindered amines (hindered amine light stabilizers; HALS compounds). The UV absorbers present as alternatives or in addition can be benzophenones, salicylic esters, cinnamic esters, oxanilides, benzoxazinones, hydroxyphenylbenzotriazoles, triazines, benztriazoles or benzylidenemalonates, preferably triazines and/or benztriazoles and particularly preferably a mixture of triazines and benztriazoles. Another alternative possibility is that UV absorbers have been polymerized into the matrix material by means of a group that is active in polymerization reactions. EP 1 963 415 provides a detailed list of suitable compounds and preferred concentration thereof in PMMA layers, for example layer B.

The impact modifiers in the layers B and/or C are preferably core-shell or core-shell-shell particles. It is preferable that at least one shell is composed of a poly(meth)acrylate. Preference is in particular given to particles with a soft core, i.e. a core with glass transition temperature below 0° C., preferably below −10° C., and with a shell with glass transition temperature above 20° C., preferably above 70° C. The soft phase here is generally composed mainly of repeating acrylate units having from 1 to 6 carbon atoms in the alkyl moiety, and the hard phase here is generally composed mainly of repeating MMA units. The average particle diameter of the impact modifiers is preferably from 10 to 150 nm. The particle diameter of the impact modifiers is determined by measurements using the ultracentrifuge method. WO 2007/073952 provides a more detailed description of suitable impact modifiers for a PMMA matrix material.

Impact modifiers that have proved particularly advantageous here are those treated by a process describer in the European Patent Application with file reference 13193654.4.

The impact-modified poly(meth)acrylate of the PMMA layer B is generally composed of from 20 to 80% by weight, preferably from 30 to 75% by weight, of the PMMA matrix material and of from 20 to 80% by weight, preferably from 25 to 70% by weight, of impact modifier. These data do not include any reference to additional substances such as scattering agents, matting agents, and any other additives or dyes that may be present.

The PMMA matrix material in layer B and the poly(meth) acrylate in layer C are preferably respectively a polymer obtained through polymerization of a composition composed of from 80 to 100% by weight of methyl methacrylate and from 0 to 20% by weight of one or more other ethylenically unsaturated monomers amenable to free-radical polymerization, preferably alkyl acrylates. It is possible here that the PMMA in layer B and the poly(meth)acrylate in layer C are identical or different in relation to composition and/or molecular weight. The expression matrix material is used hereinafter for these polymers, without inclusion of any reference to the impact modifiers. EP 1 963 415 provides a specification for the production of suitable matrix materials and a list of the comonomers that can be used.

In one particular embodiment the layer B is a PMMA layer that can withstand mechanical load. This means that the PMMA matrix material used in that location has a particularly high molar mass. This particularly high molar mass is from 100,000 to 200,000 g/mol, preferably from 120,000 to 170,000 g/mol.

The layers A, B and C of the protective film of the invention can comprise not only the components described but also other additional substances, for example dyes, processing aids or other stabilizers.

The fluoropolymer in layer A is preferably PVDF, PVF, PETFE (polyethylene-tetrafluoroethylene) or PFEVE (polyfluorinated ethylene vinyl ether). In particular, it is preferable that this fluoropolymer is a predominantly amorphous, or a microcrystalline, PVDF with a haze value smaller than 5. The layer A is particularly advantageously composed exclusively of PVDF and optional additives. These additives can by way of example be other UV stabilizers, pigments, matting agents, other stabilizers, or additives providing protection from scratching. Examples of types of PVDF having particularly good suitability with appropriately low haze value are Solef® 9009 from Solvay and Kynar® 9000HD from Arkema. The haze value is measured for this purpose on a pure fluoropolymer (PVDF) film of thickness 30 µm at 23° C. in accordance with ASTM D1003.

Layer C preferably comprises from 5 to 99% by weight, particularly from 10 to 60% by weight and in particular from 15 to 40% by weight, of adhesion promoter. It is preferable that the adhesion promoter in layer C takes the form of a copolymer comprising at least one (meth)acrylate and one copolymerizable anhydride and/or one copolymerizable diacid. It is particularly preferable that the adhesion promoter is a copolymer of MMA, styrene and maleic anhydride. A composition that has proved to be very advantageous here comprises from 5 to 40% by weight, preferably from 8 to 20% by weight, of maleic anhydride as copolymerized component. This type of adhesion promoter can in particular be produced by using bulk polymer or solution polymerization.

Surprisingly, it has been found that a protective film of the invention is not susceptible to delamination even after long-term weathering, whereas a film composed only of the layers A and C delaminates to a significantly high extent after long-term weathering. This is attributable inter alia to the styrene content in the adhesion promoter used. It is therefore in particular surprising that the same adhesion promoter in the protective film of the invention can be used with significantly reduced tendency towards delamination.

It can moreover be observed that layers A composed of a PVDF with low (micro)crystalline content, and therefore with a particularly low haze value, in the case of direct coextrusion with the composition described of the layer C, lead to flow inhomogeneities which are discernible as streaks in the final product. Surprisingly, it has been found that a corresponding protective film of the invention with the additional layer B does not exhibit these streaks.

The protective film of the invention can be produced by lamination, by a casting process, or—preferably—by coextrusion. The preferred process for the production of the protective film of the invention is a multilayer coextrusion process.

In one particular embodiment it is also possible to structure the surface of the layer A. These structures can by way of example be relatively large depressions, grain effects or matt effects. In particular, the structures can be realized by using correspondingly structured press surfaces, e.g. in the form of metal plates, during the lamination of the protective film of the invention to a resin-impregnated paper. A protective film having this type of structured layer A is therefore at the same time also a preferred embodiment of the present invention.

The present invention also includes, alongside the protective film of the invention, use thereof in the form of a process for the production of HPLs, MPLs or CPLs. In particular, the present invention provides the use of the protective film of the invention for the production of HPLs. This use takes place in particular in the context of a process in which the protective film is pressed on to melamine or phenolic-resin-impregnated paper, preferably directly to a melamine-resin-impregnated decorative paper by using a pressure≥5 MPas at a temperature≥120° C. with a cycle time of from 30 to 100 min.

The resin-impregnated papers here can in particular have a plurality of layers. Particularly widely used embodiments have a plurality of phenolic-resin-impregnated layers and, situated between these and the protective film, at least one layer impregnated with a melamine resin. This layer has also been coloured or printed, and is therefore a decorative layer. It is also possible that a thin layer made of melamine-resin-impregnated real-wood veneer is present as decorative layer onto which the protective film is then pressed.

There are two possible variants for the lamination of the protective film to the resin-impregnated papers. Firstly, the protective film can be pressed onto the HPL, MPL or CPL that has already been prefabricated, i.e. pressed. In this variant the lamination can take place within a relatively short time. However, it is preferable that the lamination of the individual paper layers and the bonding to the protective film take place in the same step. In this variant the cycle times stated above are advantageous.

EXAMPLES

The weathering tests used a Beta LM Xenotest from Atlas in accordance with DIN EN ISO 4892-2, Method A, Cycle 1. Optical and mechanical assessments were made after 0 h, 1000 h, 2500 h, 3333 h, 10,000 h and 15,000 h. Alternatively, an accelerated process was carried out, based on DIN EN ISO 4892-2, Method A, Cycle 1 but with a black standard temperature of 70° C.+/−5° C., sample compartment temperature of 40° C.+/−5° C., and UV irradiation at 180 W/m$^2$ in the wavelength range from 300 to 400 nm. Optical and mechanical assessments were made after 0 h, 333 h, 833 h, 1666 h, 2500 h, 3333 h and 5000 h.

The haze value was determined in accordance with ASTM D1003 at 23° C. The measurements to determine the haze value of the fluoropolymers were made on an appropriate monofilm of thickness 30 μm.

The UV stabilizer package used was a mixture of 46.3% by weight of Tinuvin® 360, 18.7% by weight of Sabostab® 119FL and 35.0% by weight of Tinuvin® 1600.

The HPLs were produced by simultaneous lamination of the resin-impregnated paper layers and of the superposed protective films. The core layer was composed of phenolic-resin-impregnated papers. Between these and the protective film there was a melamine-resin-impregnated decorative paper. A first HPL was used for the results according to Table 1. A similarly constructed, anthracite-coloured HPL was used from the results according Table 2.

The protective films were produced by adapter coextrusion by way of the chill-roll process. Alternatively, production can be achieved by way of a multiple-manifold coextrusion process or a combination of adapter and multiple-manifold coextrusion.

The adhesion promoter used was a copolymer of 75% by weight of MMA, 15% by weight of styrene and 10% by weight of maleic anhydride. The weight-average molar mass $M_w$ of this copolymer was about 100,000 g/mol (determined by means of GPC against a PMMA standard).

General data relating to the PMMA in the layers B and C: Matrix materials with impact modifier were used here. The impact modifier is core-shell or core-shell-shell particles. Since the outermost shell of these particles in each case mixes completely with the matrix material, the information below relating to the compositions attributes the respective exterior shells to the matrix material, and describes only the core of a core-shell particle and, respectively, the core and the inner shell of a core-shell-shell particle as impact modifier. This fraction is termed soft phase below. This also optionally comprises "hard" cores in a core-shell-shell particle.

PMMA in layer B and C: Unless otherwise stated, an impact-modified polymer comprising a PMMA matrix material made of 92.8% by weight of MMA, 7.3% by weight of butyl acrylate and 0.8% by weight of MA, and also the soft phase of a core-(shell-) shell (meth)acrylate as impact modifier, was used in layer B and C.

In Comparative Example 1 the composition of the PMMA matrix material of the layer C was different from this: 92% by weight of MMA and 8% by weight of butyl acrylate. In Inventive Examples 1 and 2 the composition of the PMMA matrix material of the layer B was respectively 96% by weight of MMA, 0.9% by weight of ethyl acrylate and 3.1% by weight of methyl acrylate.

Comparative Example 1

Layer A: 5 μm of Kureha KF Polymer T850 (PVDF) with a haze value of 11.8.

Layer C: Layer of thickness 45 μm made of 51.1% by weight of PMMA matrix material, 20% by weight of adhesion promoter, 26% by weight of soft phase and 2.9% by weight of UV stabilizer package. The impact modifier was a core-shell particle.

The HPL exhibited a significant loss of adhesion between the layers A and C (delamination) after lamination and weathering for 3333 h in a high-energy Xenotest Alpha.

Comparative Example 2

Layer A: 5 μm of Solef® 9009 with a haze value of 2.98.
Layer C: Layer of thickness 45 μm made of 59.2% by weight of PMMA matrix material, 15% by weight of adhesion promoter, 24% by weight of soft phase and 1.8% by weight of UV stabilizer package. The impact modifier was a core-shell particle.
The HPL exhibited significant blue sheen after the lamination process.

Inventive Example 1

Layer A: 5 μm of Solef® 9009
Layer B: Layer of thickness 40 μm made of 65.5% by weight of PMMA matrix material, 32.4% by weight of soft phase of a core-shell-shell particle and 2.1% by weight of UV stabilizer package.
Layer C: Layer of thickness 5 μm made of 59.2% by weight of PMMA matrix material, 15% by weight of adhesion promoter, 24% by weight of soft phase and 1.8% by weight of UV stabilizer package. The impact modifier was a core-shell particle.

Inventive Example 2

Layer A: 5 μm of Solef® 9009
Layer B: Layer of thickness 40 μm made of 65.5% by weight of PMMA matrix material, 32.4% by weight of soft phase of a core-shell-shell particle and 2.1% by weight of UV stabilizer package.
Layer C: Layer of thickness 5 μm made of 55.5% by weight of PMMA matrix material, 20% by weight of adhesion promoter, 22.8% by weight of soft phase and 1.7% by weight of UV stabilizer package. The impact modifier was a core-shell particle.

Inventive Example 3

Layer A: 5 μm of Solef® 9009
Layer B: Layer of thickness 40 μm made of 69.4% by weight of PMMA matrix material, 28.5% by weight of soft phase of a core-shell-shell particle and 2.1 by weight of UV stabilizer package.
Layer C: Layer of thickness 5 μm made of 55.5% by weight of PMMA matrix material, 20% by weight of adhesion promoter, 22.8% by weight of soft phase and 1.7% by weight of UV stabilizer package. The impact modifier was a core-shell particle.

Inventive Example 4

Layer A: 5 μm of Solef® 9009
Layer B: Layer of thickness 40 μm made of 69.4% by weight of PMMA matrix material, 28.5% by weight of soft phase of a core-shell-shell particle and 2.1% by weight of UV stabilizer package.
Layer C: Layer of thickness 5 μm made of 59.2% by weight of PMMA matrix material, 15% by weight of adhesion promoter, 24% by weight of soft phase and 1.8% by weight of UV stabilizer package. The impact modifier was a core-shell particle.

Results Table 1

| UV-protective film | Inv. Ex. 1 | Inv. Ex. 2 | Inv. Ex. 3 | Inv. Ex. 4 | Comparative Ex. 2 |
|---|---|---|---|---|---|
| "Blue sheen" | + | + | + | + | − |
| H₂O test[1)] 2 h @ 100° C. | + | + | + | + | − (haze value) |
| H₂O test 48 h @ 65° C. | + | + | + | + | + |

[1)]Adhesion test/crosscut test: passed

Results Table 2

| UV-protective film | Inv. Ex. 1 | Inv. Ex. 2 | Inv. Ex. 3 | Inv. Ex. 4 | Comparative Ex. 1 |
|---|---|---|---|---|---|
| Weathering in high-energy Alpha after 3333 h | + | + | + | 0 | −− |
| H₂O test[1)] 2 h @ 100° C. | + | + | + | + | −− (loss of adhesion) |
| H₂O test 48 h @ 65° C. | + | + | + | + | + |

The invention claimed is:
1. A UV-protective film suitable for lamination on high-pressure laminates (HIPLs), comprising, from the outside to the inside, the following layers bonded to one another:
   a layer A comprising a fluoropolymer,
   a PMMA layer B comprising a matrix material B comprising at least one impact modifier and at least one UV stabilizer and/or UV absorber, and
   a layer C comprising 5 to 35% by weight of at least one adhesion promoter and a matrix material C comprising at least one poly(meth)acrylate, at least one impact modifier and optionally, at least one UV stabilizer and/or UV absorber,
   wherein
   the PMMA matrix material in layer B and the poly(meth)acrylate in layer C are respectively a polymer obtained through polymerization of a composition composed of from 80 to 100% by weight of methyl methacrylate and from 0 to 20% by weight of one or more other ethylenically unsaturated monomers capable of free radical polymerization,
   a molar mass of the PMMA in layer B is from 100,000 to 200,000 g/mol,
   the at least one impact modifier in the layers B and C are core-shell or core-shell-shell particles having an outermost shell wherein the outermost shell of said particles completely mixes with the PMMA matrix material in layer B and the poly(meth)actylate in layer C, respectively, and
   the at least one adhesion promoter is a copolymer comprising at least one (meth)acrylate and one anhydride and/or diacid, and
   the layer C is suitable for lamination with a resin-impregnated paper to obtain an HPL.
2. The protective film according to claim 1, wherein a thickness of layer A is from 1 to 25 μm, a thickness of layer B is from 15 to 125 μm and a thickness of layer C is from 1 to 25 μm.
3. The protective film according to claim 1, wherein the layer B comprises HALS compounds and triazines and/or benzotriazoles; and layer C optionally comprises HALS compounds and triazines and/or benzotriazoles.

4. The protective film according to claim 1, wherein the fluoropolymer in layer A is polyvinylidene fluoride (PVDF), polyvinylfluoride (PVF), polyethylene-tetrafluoroethylene (PETFE) or polyfluorinated ethylene vinyl ether (PFEVE).

5. The protective film according to claim 4, wherein the fluoropolymer is a predominantly amorphous PVDF with a haze value smaller than 5 or a microcrystalline PVDF with a haze value smaller than 5.

6. The protective film according to claim 1, wherein layer A consists of PVDF and optional additives.

7. The protective film according to claim 1, wherein the adhesion promoter in layer C is a copolymer of MMA, styrene and maleic anhydride.

8. The protective film according to claim 1, wherein, after a press procedure, the layer A has a structure on the external side.

9. A process for the production of a protective film according to claim 1, wherein the protective film is produced by adapter coextrusion or multiple-manifold coextrusion or a combination of the two processes.

10. A method for the production of HPLs, MPLs or CPLs comprising lamination of the protective film according to claim 1 onto a resin-impregnated paper layer.

11. The method according to claim 10, wherein the protective film is pressed directly onto a melamine-resin-impregnated paper layer.

12. The method according to claim 10, wherein the protective film is pressed onto a melamine-resin-impregnated paper in a press by a pressure $\geq 5$ Mpas at a temperature $\geq 120°$ C. with a cycle time of from 30 to 100 min.

13. The method according to claim 12, wherein in the press on the side counterposed to the layer A there is a structured surface.

* * * * *